J. B. LEE.
SIPHON.
APPLICATION FILED OCT. 17, 1907.

915,867.

Patented Mar. 23, 1909.
2 SHEETS—SHEET 1.

Witnesses,
Carrie R. Ivy
William Whaley

Inventor,
James B. Lee
By Cyrus Kehr
Attorney.

THE NORRIS PETERS CO., WASHINGTON, D. C.

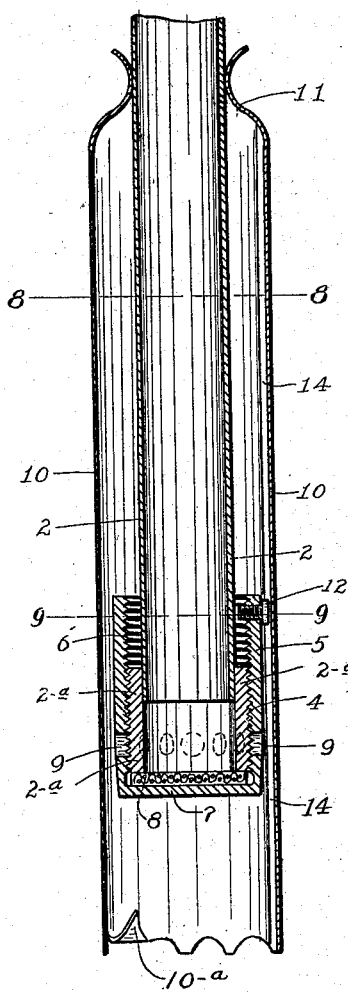

UNITED STATES PATENT OFFICE.

JAMES B. LEE, OF KNOXVILLE, TENNESSEE.

SIPHON.

No. 915,867.    Specification of Letters Patent.    Patented March 23, 1909.

Application filed October 17, 1907. Serial No. 397,779.

*To all whom it may concern:*

Be it known that I, JAMES B. LEE, a citizen of the United States, residing at Knoxville, in the county of Knox and State of Tennessee, have invented a new and useful Improvement in Siphons, of which the following is a specification, reference being had to the accompanying drawing.

My improvement relates particularly to siphons intended for periodically withdrawing portions of the liquid contained in a relatively large receptacle from said receptacle into smaller receptacles.

The object of the invention is to provide a siphon adapted for the ready closing of the lower end of the long arm of the siphon when it is desired to interrupt the flow of liquid, such closing serving to retain liquid in the siphon ready for a renewal of the flow when said arm is again opened, "starting", "priming", or filling the siphon being necessary only when the first instalment of liquid is drawn from the larger vessel. To make such siphon convenient and effective for all uses, the mechanism for closing the lower end of said long arm of the siphon must be so compact as to permit the insertion of said arm through relatively small throats or ports of receptacles into which the liquid is to be drawn from the larger receptacle.

Figure 1:
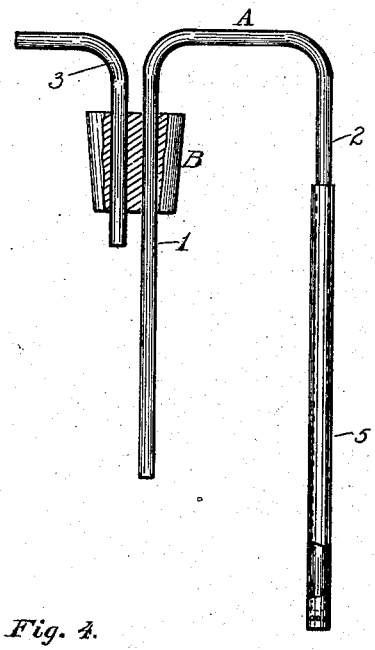
Figure 2:
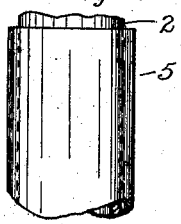
Figure 3:
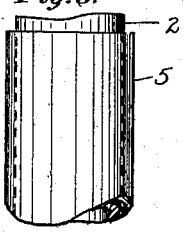
Figure 4:
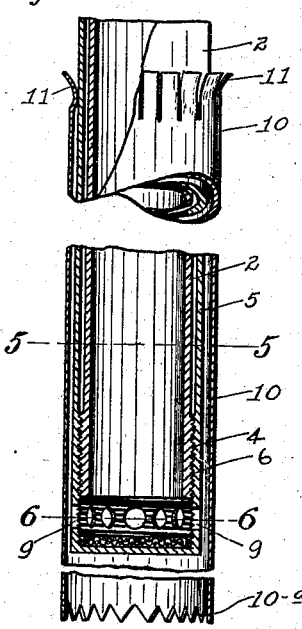
Figure 5:
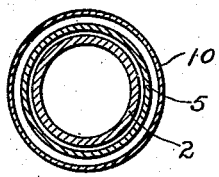
Figure 6:
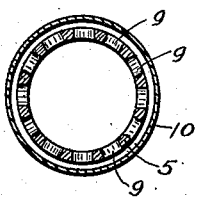

In the accompanying drawings, Figure 1 is a side elevation of a siphon embodying my improvement; Fig. 2 is an upright section of the lower portion of the long arm of the siphon shown in Fig. 1, the valve at the lower end of said arm being open; Fig. 3 is a view similar to Fig. 2, excepting that the valve at the lower end of the long siphon arm is closed; Fig. 4 is a view similar to Fig. 2, an extension tube having been added; Fig. 5 is a section on the line 5—5 of Fig. 4; Fig. 6 is a section on the line 6—6 of Fig. 4; Fig. 7 is another section similar to Figs. 2 and 4, showing a further modification; Fig. 8 is a section on the line 8—8 of Fig. 7; Fig. 9 is a section on the line 9—9 of Fig. 7; Figs. 10 and 11 show a modification of the structure illustrated by Fig. 9; Fig. 12 shows a further modification of the extension tube; Fig. 13 is a cross sectional view of one form of extension tube.

Referring to Figs. 1, 2, and 3 of the drawings, A is a siphon tube having a short arm, 1, and a long arm, 2.

B is a suitable stopper adapted to be seated in the mouth of a vessel from which a liquid is to be drawn. The short arm, 1, of the siphon tube extends through said stopper. Through the same stopper extends a short pipe or tube, 3, open at each end. When the siphon is to be "primed" or filled after insertion into the aforesaid receptacle, air is blown into the upper end of said pipe, 3, and thereby pressure is put upon the surface of the liquid and said liquid is made to rise through the arm, 1, of the siphon into the arm, 2. Any other means may be used as a substitute for said pipe; for such means does not constitute a part of the present invention.

The lower end of the long arm, 2, is provided with a closing valve as follows: Said arm is provided with exterior threads, 4, and surrounding said arm is a tubular sleeve, 5, provided in its lower portion with interior threads, 6, engaging the threads, 4, of the arm, 2, so that said sleeve may be raised and lowered by rotating it. The lower end of said sleeve has a bottom wall, 7, whereby it is closed, and upon said wall rests a diskform piece of packing, 8, which is pressed between said bottom wall and the lower end of the wall of the arm, 2, when the sleeve, 5, is screwed upward to its limit as shown in Fig. 3. When thus compressed in such position, said packing forms a seal over the lower end of the arm, 2, so that no liquid can pass downward out of said arm into the sleeve. At a little distance above the bottom wall, 7, of the sleeve, 5, and above the packing, 8, said sleeve is provided with any desired number of ports, 9, through which liquid may pass. When the sleeve, 5, has been screwed downward far enough to release the packing, 8, from the arm, 2, and bring said ports, 9, below the lower end of said arm, liquid may pass downward through said arm into the sleeve, 5, and thence outward through the ports, 9. (See Fig. 2.) But when the sleeve, 5, has been screwed to its upper limit, the seal formed by the packing, 8, at the lower end of the arm, 2, prevents the liquid in the arm, 2, from passing out of the lower end of said arm and reaching said ports, 9.

In operation, the siphon is inserted into two receptacles in the usual manner, the short arm, 1, being inserted into the receptacle which contains a relatively large quantity from which portions are to be drawn at intervals, and the long arm being inserted into a receptacle which is to receive only a portion of the liquid from the other receptacle. The sleeve, 5, is turned or screwed downward to open the valve either before or after insertion into the second receptacle.
Said sleeve is long enough to reach above the mouth of the receptacle into which the long arm of the siphon is inserted, in order that said sleeve may be reached for turning while said arm is so inserted. Then, by blowing through the pipe, 3, or otherwise, the siphon is filled, the liquid then flowing upward through the short arm and downward through the long arm. When the desired quantity of liquid has passed into the second receptacle, the flow is stopped by screwing the sleeve, 5, upward until the packing, 8, is engaged as above described. Then the receptacle into which said long arm extends is removed. The siphon will now remain filled or "primed" until the sleeve, 5, is again screwed downward, and the valve opened, which is done after again putting the same or another receptacle into position to receive another portion of liquid. And such operation is repeated, if so desired, without refilling or repriming the siphon, until the first receptacle has been emptied.

In Figs. 4, 5, and 6, an extension tube, 10, loosely surrounds the sleeve, 5, and is adjustable up and down upon said sleeve by any suitable means. The drawings show flexible tongues, 11, cut from the wall of said sleeve and bent into proper form to bear frictionally against the sleeve, 5. When liquid is to be delivered into a vessel which can not be conveniently set high enough to permit the sleeve, 5, to extend into said vessel, the extension tube, 10, is moved downward upon said sleeve far enough to enter the mouth of said vessel. Said extension tube may be made long enough to extend to any desired distance below the lower end of the sleeve, 5.

In Figs. 7, 8, and 9, the main portion of the arm, 2, is made of thin sheet metal, and the lower portion thereof is made of a thicker tubular piece, 2ª, which is soldered or otherwise secured to said main portion and has around its exterior the threads, 4. The object of this variation is to cheapen the manufacture of the siphon. And in said Figs. 7, 8, and 9, the sleeve, 5, is made shorter than in Figs. 2, 3, and 4—only long enough to extend a little way above the thick portion, 2ª, of the arm, 2, (see Fig. 7). The interior of said sleeve is provided with screw threads, 6, and ports, 9, as in Figs. 2, 3, and 4. Through the upper portion of said sleeve extends a horizontal set-screw, 12, the inner end of which meets and bears upon the upper end of the portion, 2ª, of the arm, 2, when the sleeve, 5, has been screwed downward as far as desired. Thus said screw serves as a stop for limiting the downward movement of said sleeve. Surrounding the sleeve, 5, and the arm, 2, is an extension tube, 10, made of sheet metal and resting in frictional engagement with the arm, 2, (instead of the sleeve, 5, as in Fig. 4) by means of tongues, 11, as shown in Fig. 4. On the inner face of the extension tube, 10, is a longitudinal tongue or rib, 14, resting slidably in the head-slot, 13, of the screw, 12. By this means, engagement is made between said extension tube and the sleeve, 5, whereby the latter may be rotated by the rotation of said extension tube; and, obviously, such engagement may be multiplied by placing more such screws in the sleeve, 5, and more such ribs or tongues 14, in the tube, 10, to engage in the headslots of such screws.

In Figs. 10 and 11, the set-screw, 12, is omitted, a stop, 15, substituted therefor, and an upright channel, 16, cut into the exterior face of the sleeve, 5, to slidably receive the rib or tongue, 14.

A convenient way for making the tongue or rib, 14, is to make the extension tube, 10, of sheet metal by lapping the edges and flanging the inner edge inward, as shown in Fig. 13.

The extension tube, 10, may be provided with any suitable means for limiting up-and-down movement. In the form shown in Fig. 7, the tongues, 11, will bear against the upper end of the sleeve, 5, when the extension tube is lowered far enough. Thus a limit to downward movement is formed. The lower end of the extension tube is toothed or scalloped so that there may be spaces for the outflow of liquid even when said tube rests upon the bottom of the vessel; and one of the teeth, 10ª, thus formed is bent inward so that it will strike against the bottom of the sleeve, 5, when the extension tube is raised high enough. Thus said tooth forms a stop or limit for the upward movement of the extension tube.

In Fig. 12, the lower end of the extension tube, 10, is made tapering or funnel-form to adapt it to partially enter an orifice of less diameter than the diameter of the main portion of said tube.

I claim as my invention:

1. A siphon comprising a valve at the lower end of the long arm, means for actuating said valve, and an extension tube slidable up and down on said long arm and operating said valve-actuating means.

2. A siphon comprising a valve at the lower end of the long arm, means for actuating said valve, and an extension tube slidable up and down on said long arm and operating said valve-actuating means and provided with limiting stops.

3. A siphon comprising a valve at the lower end of the long arm, a sleeve surrounding said long arm and in operative relation with said valve, and an extension tube slidable up and down on said long arm and operating said sleeve.

4. A siphon comprising a valve at the lower end of the long arm, a sleeve surrounding said long arm and in operative relation with said valve, and an extension tube slidable up and down and operating said sleeve and provided with limiting stops.

5. A siphon comprising a sleeve extending around the lower end of the long arm and adjustable up and down and having a closed bottom and ports along its sides, means for limiting the downward movement of said sleeve, and an extension tube in engagement with said sleeve for turning the latter.

6. A siphon comprising a sleeve extending around the lower end of the long arm and adjustable up and down and having a closed bottom and ports along its sides, means for limiting the downward movement of said sleeve, and an extension tube in engagement with said sleeve for turning the latter and slidable up and down upon said sleeve.

7. A siphon comprising a sleeve extending around the lower end of the long arm and adjustable thereon up and down and having a closed bottom and ports along its sides, means for limiting the downward movement of said sleeve, and an extension tube having a longitudinal interior rib slidably engaged with said tubular sleeve.

In testimony whereof I have signed my name, in presence of two witnesses, this 15th day of October, in the year one thousand nine hundred and seven.

JAMES B. LEE.

Witnesses:
CYRUS KEHR,
W. W. LEE.